United States Patent
Sarwer et al.

(10) Patent No.: US 11,503,311 B2
(45) Date of Patent: Nov. 15, 2022

(54) HYBRID PALETTE-DPCM CODING FOR IMAGE COMPRESSION

(71) Applicant: SONY CORPORATION, Tokyo (JP)

(72) Inventors: Mohammed Golam Sarwer, Sunnyvale, CA (US); Ali Tabatabai, Cupertino, CA (US)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/297,522

(22) Filed: Mar. 8, 2019

(65) Prior Publication Data

US 2020/0288154 A1 Sep. 10, 2020

(51) Int. Cl.
| | | |
|---|---|---|
| H04N 19/186 | (2014.01) | |
| H04N 19/176 | (2014.01) | |
| H04N 19/91 | (2014.01) | |
| H04N 19/124 | (2014.01) | |
| H04N 19/136 | (2014.01) | |

(52) U.S. Cl.
CPC ......... *H04N 19/186* (2014.11); *H04N 19/124* (2014.11); *H04N 19/136* (2014.11); *H04N 19/176* (2014.11); *H04N 19/91* (2014.11)

(58) Field of Classification Search
CPC .. H04N 19/186; H04N 19/124; H04N 19/136; H04N 19/176; H04N 19/91
USPC ........................................................ 382/243
See application file for complete search history.

(56) References Cited

U.S. PATENT DOCUMENTS

| | | | |
|---|---|---|---|
| 8,406,314 B2 | 3/2013 | Lei et al. | |
| 2015/0016501 A1* | 1/2015 | Guo ........................ | H04N 19/93 375/240.02 |
| 2015/0271505 A1 | 9/2015 | Ma et al. | |
| 2015/0341635 A1 | 11/2015 | Seregin et al. | |
| 2015/0365670 A1* | 12/2015 | Chang ................... | H04N 19/593 375/240.02 |
| 2015/0365671 A1 | 12/2015 | Pu et al. | |
| 2015/0381994 A1* | 12/2015 | Yu ........................ | H04N 19/186 375/240.24 |
| 2016/0007042 A1 | 1/2016 | Pu et al. | |
| 2016/0142712 A1* | 5/2016 | Karkkainen .......... | H04N 19/132 375/240.02 |
| 2016/0227231 A1 | 8/2016 | Xiu et al. | |
| 2016/0309183 A1 | 10/2016 | Sun et al. | |

(Continued)

FOREIGN PATENT DOCUMENTS

| | | |
|---|---|---|
| CN | 105556974 A | 5/2016 |
| CN | 105794116 A | 7/2016 |

(Continued)

OTHER PUBLICATIONS

Xu, J, et al.,"Overview of the Emerging HEVC Screen Content Coding Extension", Mitsubishi Electric Research Laboratories, http://www.merl.com.

*Primary Examiner* — Charles N Appiah
*Assistant Examiner* — Nicole M Louis-Fils
(74) *Attorney, Agent, or Firm* — Haverstock & Owens, A Law Corporation

(57) ABSTRACT

A hybrid palette-DPCM coding implementation generates a palette for the most dominant colors in an image block and an index block based on the palette. Additionally, for pixels that are not in the palette, DPCM coding is utilized. By combining palette coding and DPCM coding, the image encoding process is optimized.

15 Claims, 11 Drawing Sheets

(56) References Cited

U.S. PATENT DOCUMENTS

| | | | | |
|---|---|---|---|---|
| 2016/0381388 A1* | 12/2016 | Kazui | ............... | H04N 19/176 |
| | | | | 382/166 |
| 2017/0085891 A1* | 3/2017 | Seregin | ............... | H04N 19/186 |
| 2017/0099490 A1* | 4/2017 | Seregin | ............... | H04N 19/159 |
| 2017/0374366 A1* | 12/2017 | Xiu | ............... | H04N 19/129 |
| 2018/0288415 A1* | 10/2018 | Li | ............... | H04N 19/124 |
| 2021/0029367 A1 | 1/2021 | Laroche et al. | | |

FOREIGN PATENT DOCUMENTS

| | | | |
|---|---|---|---|
| CN | 106664405 | A | 5/2017 |
| CN | 107431817 | A | 12/2017 |
| CN | 108028940 | A | 5/2018 |
| JP | 2017525204 | A | 8/2017 |
| JP | 2018530962 | A | 10/2018 |
| JP | 2018532319 | A | 11/2018 |
| KR | 20160134743 | A | 11/2016 |
| KR | 101897378 | B1 | 9/2018 |
| KR | 101906740 | B1 | 10/2018 |

* cited by examiner

YUV422 color vectors

Fig. 5

Index Value (i) = 0 → P (where P = Palette Size)

| Palette Size | Entropy Coded bits for index Array (if P is not Zero) | Bits for color palette (if P is not Zero) | DPCM coding bits for escape pixels | Zero pad |
|---|---|---|---|---|

Palette size = 1

| Index value | Code word | Code length |
|---|---|---|
| 0 | 0 | 1 |
| 1 | 1 | 1 |

Palette size = 2

| Index value | Code word | Code length |
|---|---|---|
| 0 | 0 | 1 |
| 1 | 10 | 2 |
| 2 | 11 | 2 |

Palette size = 3

| Index value | Code word | Code length |
|---|---|---|
| 0 | 0 | 1 |
| 1 | 10 | 2 |
| 2 | 110 | 3 |
| 3 | 111 | 3 |

Palette size = 4

| Index value | Code word | Code length |
|---|---|---|
| 0 | 0 | 1 |
| 1 | 10 | 2 |
| 2 | 110 | 3 |
| 3 | 1110 | 4 |
| 4 | 1111 | 4 |

Truncated Unary coding is used to code index Array

| Index value (i = 0 → P) | Code word | |
|---|---|---|
| | Number of 1's | Zeros |
| i < P | i Ones | 0 |
| i = P | i Ones | NA |

Fig. 8

Entropy Coded bits for color palette:

| Palette Size | Entropy Coded bits for index Array (if P is not Zero) | Bits for color palette (if P is not Zero) | DPCM coding bits for escape pixels | Zero pad |

Index=2 | 1000, 0, 0
Index=1 | 512, 512, 100
Index=0 | 110, 512, 100

Color palette of 3 color vectors

Fig. 9

Quant → DPCM → Entropy Coding

| Palette Size | Entropy Coded bits for index Array (if P is not Zero) | Bits for color palette (if P is not Zero) | DPCM coding bits for escape pixels | Zero pad |

Fig. 10

HYBRID PALETTE-DPCM CODING FOR IMAGE COMPRESSION

FIELD OF THE INVENTION

The present invention relates to video coding. More specifically, the present invention relates to image compression.

BACKGROUND OF THE INVENTION

Video coding includes quantization, Differential Pulse-Code Modulation (DPCM), entropy coding and refinement. Entropy coding is a lossless data compression scheme which compresses data by replacing each fixed-length input symbol with the corresponding variable-length prefix-free output codeword.

SUMMARY OF THE INVENTION

A hybrid palette-DPCM coding implementation generates a palette for the most dominant colors in an image block and an index block based on the palette. Additionally, for pixels that are not in the palette, DPCM coding is utilized. By combining palette coding and DPCM coding, the image encoding process is optimized.

In one aspect, a method programmed in a non-transitory memory of a device comprises generating a palette for an image block, generating an index block for the image block, transmitting the palette and the index block and encoding escape pixels using differential pulse-code modulation. Generating the palette includes: for a palette size of N, determining N most common colors in the image block and assigning an index to each color of the N most common colors. Determining the N most common colors includes counting a number of pixels of each color. The index block is the same size as the image block, further wherein generating the index block includes placing indexes from the palette in the index block to represent pixel values, wherein an index of N+1 is placed in the locations for the escape pixels. Encoding the escape pixels includes quantizing the escape pixels, applying the differential pulse-code modulation to the escape pixels, and entropy coding the escape pixels. Transmitting the palette and the index block and encoding the escape pixels generate a bitstream including a palette size, an entropy coded index array, bits for the palette and differential pulse-code modulation bits for the escape pixels. The method further comprises decoding the palette and the index block, decoding the escape pixels using inverse differential pulse-code modulation and combining the decoded palette, index block and escape pixels to generate a decoded image.

In another aspect, an apparatus comprises a non-transitory memory for storing an application, the application for: generating a palette for an image block, generating an index block for the image block, transmitting the palette and the index block and encoding escape pixels using differential pulse-code modulation and a processor coupled to the memory, the processor configured for processing the application. Generating the palette includes: for a palette size of N, determining N most common colors in the image block and assigning an index to each color of the N most common colors. Determining the N most common colors includes counting a number of pixels of each color. The index block is the same size as the image block, further wherein generating the index block includes placing indexes from the palette in the index block to represent pixel values, wherein an index of N+1 is placed in the locations for the escape pixels. Encoding the escape pixels includes quantizing the escape pixels, applying the differential pulse-code modulation to the escape pixels, and entropy coding the escape pixels. Transmitting the palette and the index block and encoding the escape pixels generate a bitstream including a palette size, an entropy coded index array, bits for the palette and differential pulse-code modulation bits for the escape pixels. The application is further for decoding the palette and the index block, decoding the escape pixels using inverse differential pulse-code modulation and combining the decoded palette, index block and escape pixels to generate a decoded image.

In another aspect, a system comprises a first computing device configured for: generating a palette for an image block, generating an index block for the image block, transmitting the palette and the index block and encoding escape pixels using differential pulse-code modulation, and a second computing device configured for: decoding the palette and the index block, decoding the escape pixels using inverse differential pulse-code modulation and combining the decoded palette, index block and escape pixels to generate a decoded image. Generating the palette includes: for a palette size of N, determining N most common colors in the image block and assigning an index to each color of the N most common colors. Determining the N most common colors includes counting a number of pixels of each color. The index block is the same size as the image block, further wherein generating the index block includes placing indexes from the palette in the index block to represent pixel values, wherein an index of N+1 is placed in the locations for the escape pixels. Encoding the escape pixels includes quantizing the escape pixels, applying the differential pulse-code modulation to the escape pixels, and entropy coding the escape pixels. Transmitting the palette and the index block and encoding the escape pixels generate a bitstream including a palette size, an entropy coded index array, bits for the palette and differential pulse-code modulation bits for the escape pixels.

BRIEF DESCRIPTION OF THE DRAWINGS

FIG. 5 illustrates YUV 422 color vectors according to some embodiments.

FIG. 8 illustrates a diagram of entropy coding the index array according to some embodiments.

FIG. 9 illustrates a diagram of entropy coding the bits for the color palette according to some embodiments.

FIG. 10 illustrates a diagram of the bitstream with DPCM coding highlighted according to some embodiments.

DETAILED DESCRIPTION OF THE PREFERRED EMBODIMENT

By combining palette and Differential Pulse-Code Modulation (DPCM), image compression is able to be optimized.

Figure 1:
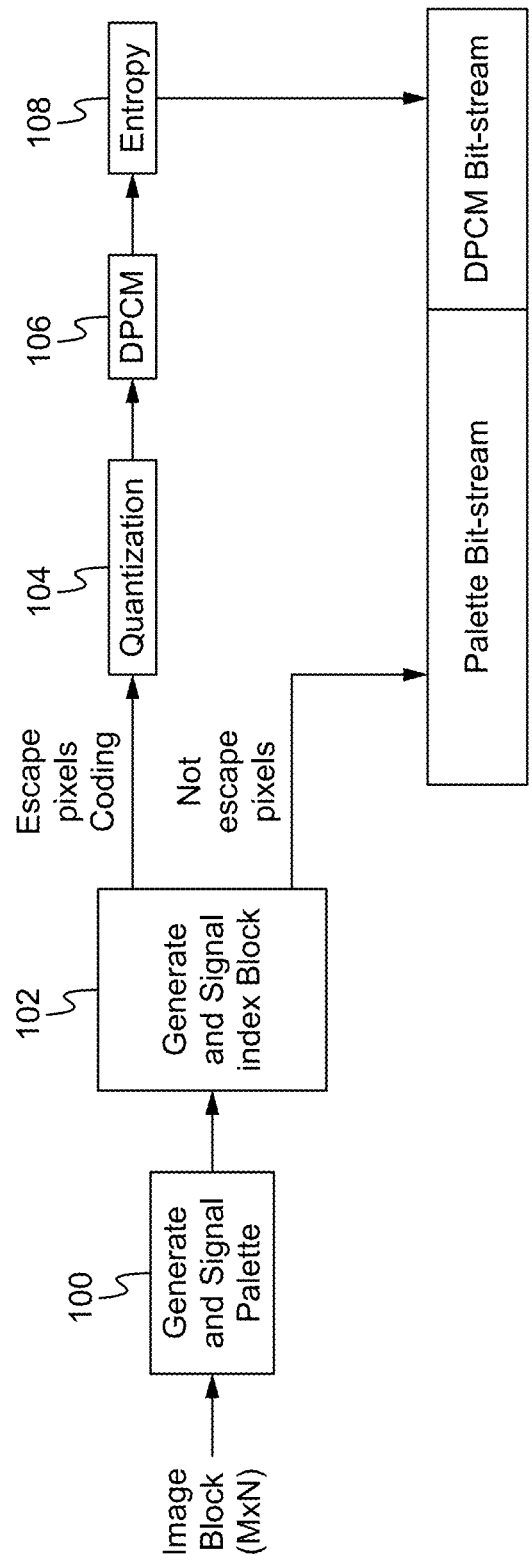
FIG. 1 illustrates a flowchart of a hybrid palette-DPCM coder/decoder ("codec") on the encoder side according to some embodiments.
Figure 2:
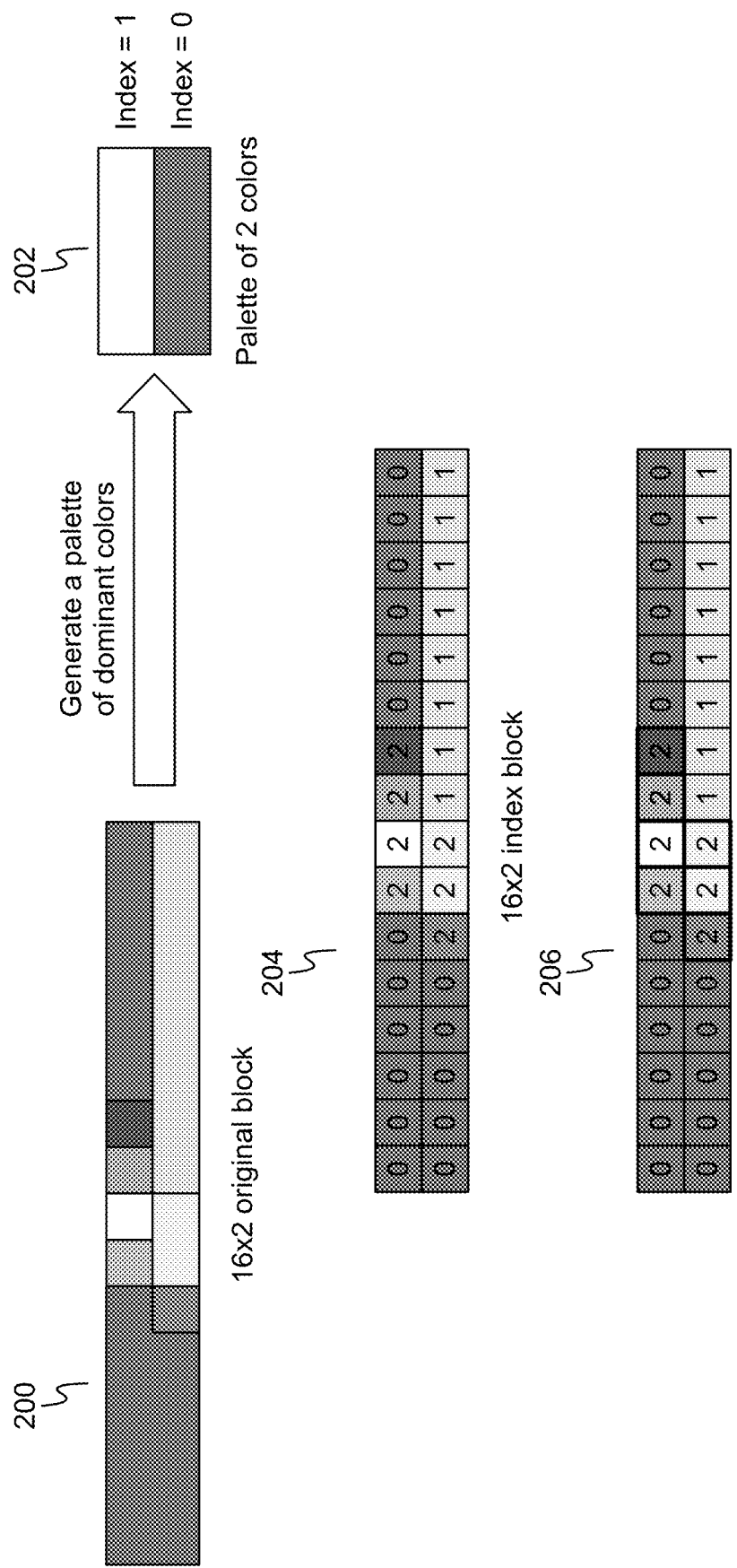
FIG. 2 illustrates a diagram of generating and signaling a palette and an index block according to some embodiments.

FIG. 1 illustrates a flowchart of a hybrid palette-DPCM coder-decoder ("codec") on the encoder side according to some embodiments. An M×N image block is received (e.g., 16×2). In the step 100, a palette is generated and signaled by analyzing the image block to determine how many colors the block has. Determining how many colors the block has is able to be based on histogram data or pre-analysis information. A palette is generated to include dominant colors. For example, for a palette with the size of 2, the two colors of the pixels that appear most often in the block are in the palette. The palette indexes the colors (e.g., color of most pixels=index 0, color of $2^{nd}$ most pixels=index 1). In the step 102, an index box is generated and signaled. The index box indicates which colors are in the image block using the palette. For example, the index box uses: a 0 in the position where the most common color pixel is, a 1 in the position where the $2^{nd}$ most common color pixel is, and a 2 in the position for any other color (the pixels that are any other color are referred to as escape pixels). FIG. 2 and herein further describe how a palette and index block are generated.

After generating the index block, different steps occur for the escape pixels and non-escape pixels. An escape pixel is a pixel that is not in the palette; therefore, non-escape pixels are in the palette. The non-escape pixels, or the pixels that are in the palette, are transmitted in the palette bitstream.

In the step 104, the escape pixels are quantized, then in the step 106, DPCM is implemented, and in the step 108 entropy coding is utilized to encode the escape pixels. The encoded escape pixels are the DPCM bitstream. In some embodiments, the quantization, DPCM and entropy coding are conventional implementations.

In some embodiments, fewer or additional steps are implemented. In some embodiments, the order of the steps is modified.

FIG. 2 illustrates a diagram of generating and signaling a palette and an index block according to some embodiments. As shown in an example, for a 16×2 block 200, the palette size P is 2. Although a 16×2 block 200 with a palette size of 2 is described, the size of the block and the palette size are able to be other sizes. To generate the palette 202 in the step 100, the two most dominant colors (since P=2) are determined. Dominant colors are determined by counting the number of pixels of each color, and the highest counts are dominant. For example, as shown in FIG. 2, the dominant colors are dark gray (17 pixels) and white (8 pixels), while the other pixels, such as light grays, are 1-3 pixels each. The most dominant color is assigned index 0, and the second most dominant color is assigned index 1. For this example, dark gray is index 0, and white is index 1.

In the step 102, the index block 204 is generated and signaled. In some embodiments, the index block 204 is the same size as the image block 200. For example, if the image block 200 is 16×2, then the index block 204 is 16×2. When generating the index block 204, the dark gray pixels are represented by zeros, and the white pixels are represented by ones. Any pixels that are another color are represented by twos, which means they are not in the palette (e.g., they are escape pixels 206).

Only the pixels with the index/value of 2 (e.g., escape pixels) go through the quantization (104), DPCM (106) and entropy coding (108) steps. Any conventional quantization, DPCM and entropy coding implementations are able to be utilized.

Although the figures are shown in grayscale, obviously the method/system described herein is able to be implemented for all colors.

Figure 3:
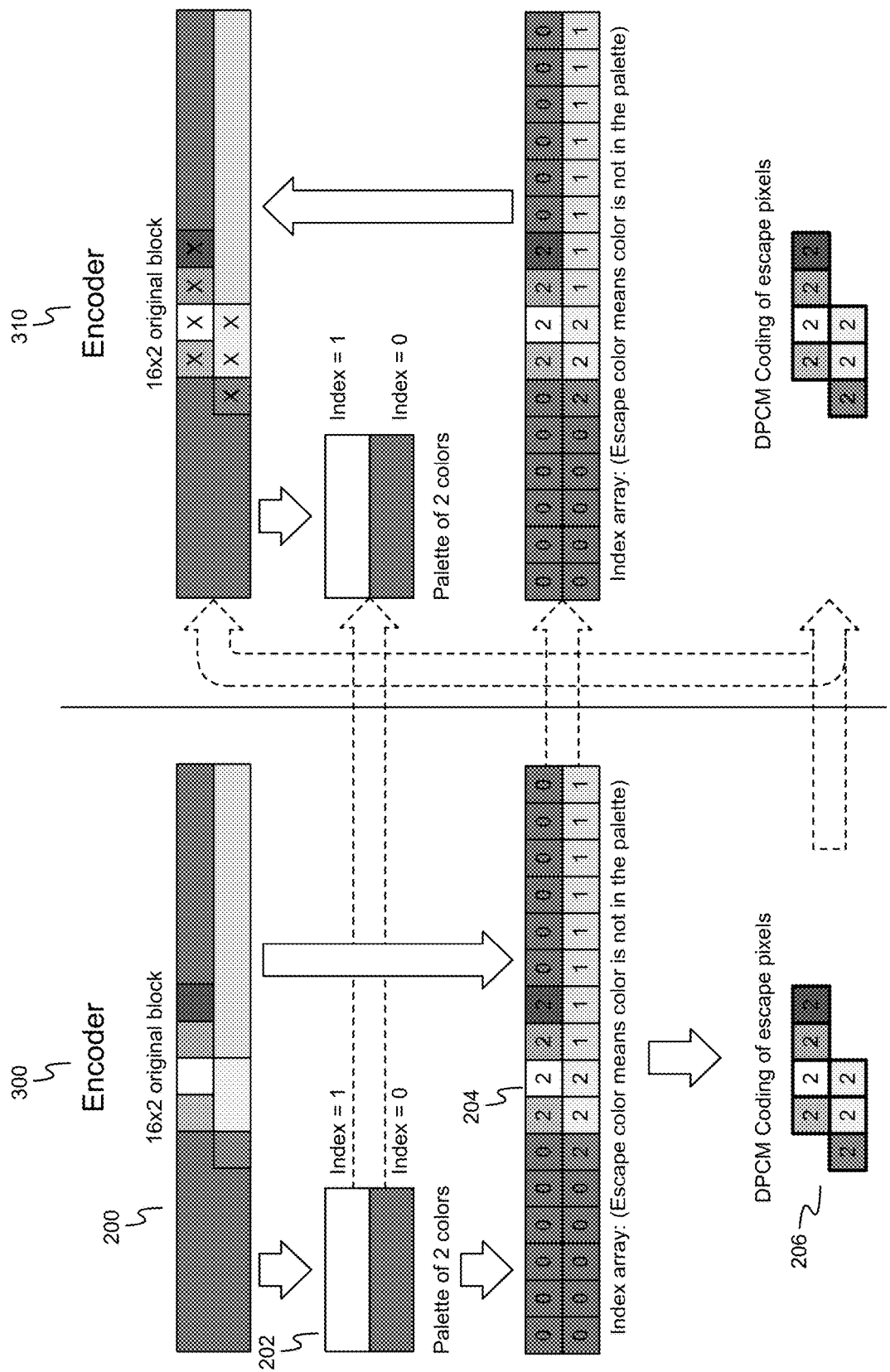
FIG. 3 illustrates a diagram of the codec implementing the hybrid palette-DCPM coding according to some embodiments.

FIG. 3 illustrates a diagram of the codec implementing the hybrid palette-DCPM coding according to some embodiments. On the encoder side 300, a palette 202 and index block 204 are generated from the original block 200 using only the two dominant colors. The palette 202 and index block 204 with the two dominant colors are transmitted to the decoder 310. In some embodiments, transmitting the palette 202 and the index block 204 to the decoder 310 includes entropy coding the palette 202 and the index block 204. The escape pixels 206 are DPCM coded and are then transmitted to the decoder 310. The decoder 310 then decodes the encoded data based on the palette/index block information and the DPCM information. The decoder 310 reconstructs the block using the index block and palette information first, and then the escape pixels 206 are reconstructed from the DPCM block.

Figure 4:
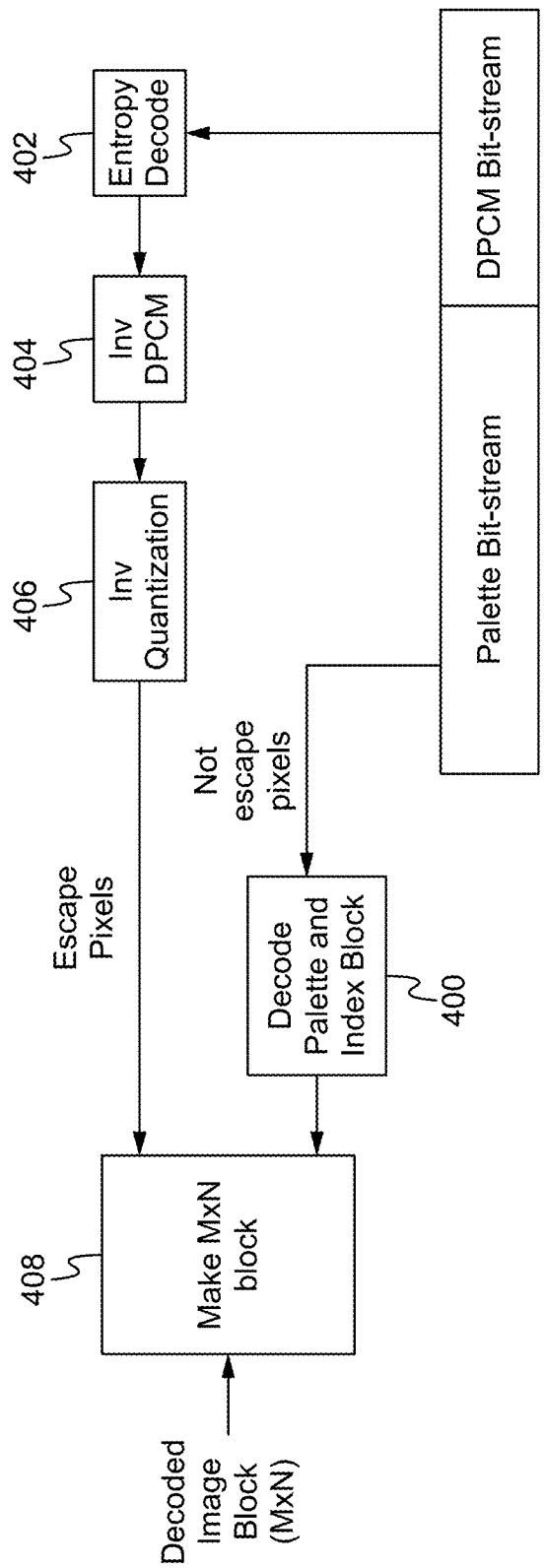
FIG. 4 illustrates a flowchart of a hybrid palette-DPCM codec on the encoder side according to some embodiments.

FIG. 4 illustrates a flowchart of a hybrid palette-DPCM codec on the encoder side according to some embodiments. For non-escape pixels, which come from the palette bitstream, the palette and index block are decoded, in the step 400. For escape pixels, which come from the DPCM bitstream, the data is entropy decoded in the step 402, inverse DPCM is applied in the step 404, and inverse quantization 406 is applied to retrieve the decoded escape pixels. The decoded palette and index block are combined with the escape pixels to generate the M×N block, in the step 408, which is the decoded image block. Combining the decoded palette, index block and escape pixels includes replacing the indexes with the palette values and the DPCM-decoded escape pixels. In some embodiments, fewer or additional steps are implemented. In some embodiments, the order of the steps is modified.

Figure 5:
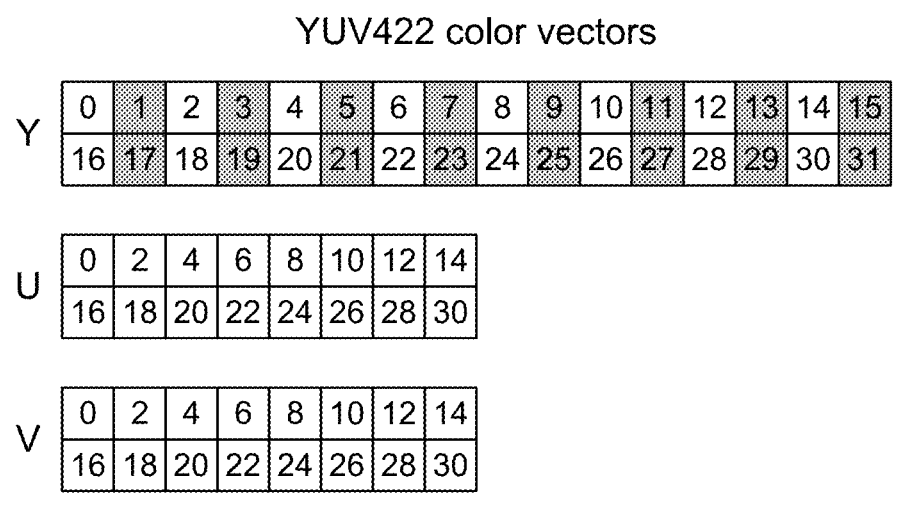

FIG. 5 illustrates YUV 422 color vectors according to some embodiments. For YUV 444, each color vector has 3 components (Y, U, V). However, for YUV 422, not all Y pixels have corresponding U and V values. As shown, the white part of luma has Y, U and V values, but the gray part of luma only has a valid Y, while the U and V are dummy values. Each number shown represents one color vector. For example, $(Y_0, U_0, V_0)$ is one color vector. $(Y_1, dummyU, dummyV)$ is another color vector.

An exemplary data structure used in ref C for one color vector is:

```
//color vector for graphics mode
typedef struct
    {
    UIntl6 pixel[3];    //pixel[0] = Y, pixel[1] = U, pixel[2] = V
    Uint8 lumaOnly;     //For yuv 422 case, for white in Figure,
                        lumaOnly = 0
                        //For gray, lumaOnly = 1
                        //For YUV 444 case, lumaOnly flag is
                        always 0
    } yuvVector;
```

For a color vector whose lumaOnly=1, only the luma value is considered for all computations.

Figure 6:
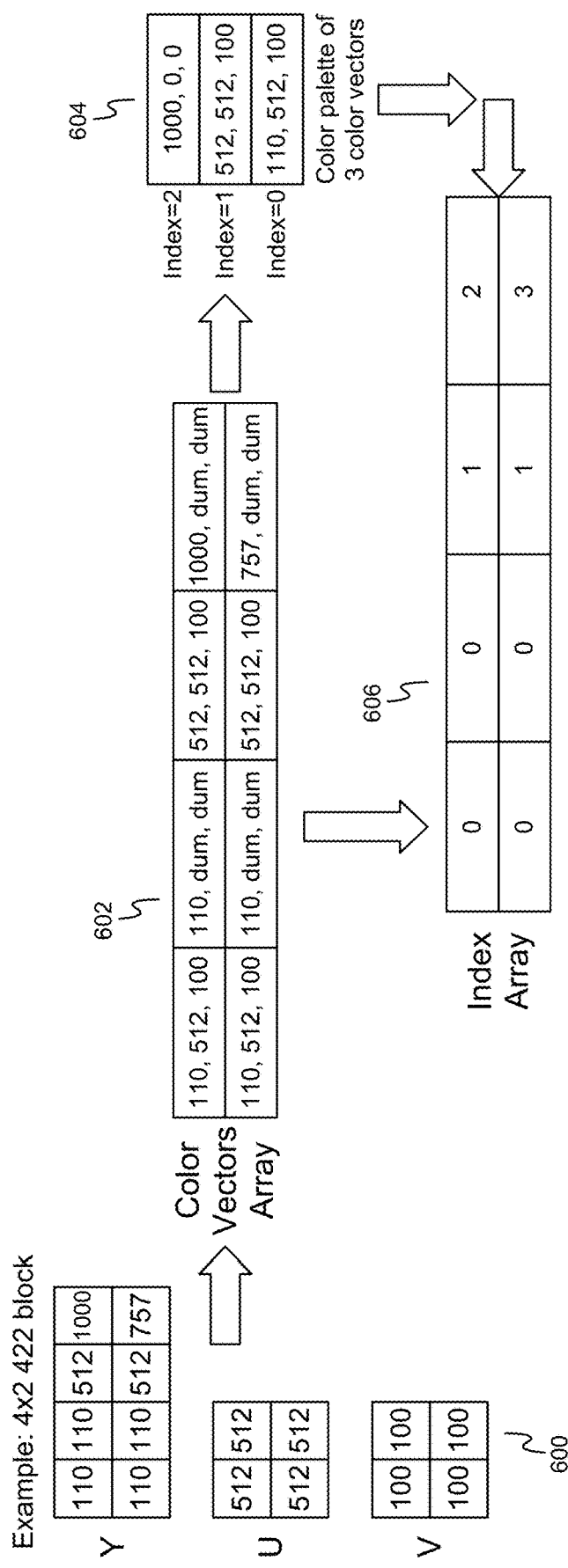
FIG. 6 illustrates a diagram of generating a palette according to some embodiments.

FIG. 6 illustrates a diagram of generating a palette according to some embodiments. A color palette has multiple color vectors. Each vector has all 3 components. For index generation, if lumaOnly=1; only the luma value is compared; otherwise, all YUV values are compared.

As shown, for an exemplary 4×2 YUV 422 block 600, the YUV components are placed in a color vector array 602. In the color vector array 602, dummy values are used for some of the UV components. Based on the color vector array 602, a color palette 604 of 3 color vectors is generated. For example, since the color vector 110, 512, 100 is the most common color vector (4 color vectors when including the 110, dum, dum vectors), then that color vector is index 0. Color vector 512, 512, 100 is the $2^{nd}$ most common color vector (2 color vectors), so it is index 1. Index 2 is color vector 1000, 0, 0 (1 color vector). Then, based on the color vector array 602 and the palette 604, an index array 606 is generated. Instead of having the color vector array 602 with color vectors, the index array 606 includes indexes 0, 1, 2 and 3 based on the palette 604. Index 3 is an escape pixel since it is not part of the palette 604.

Figure 7:
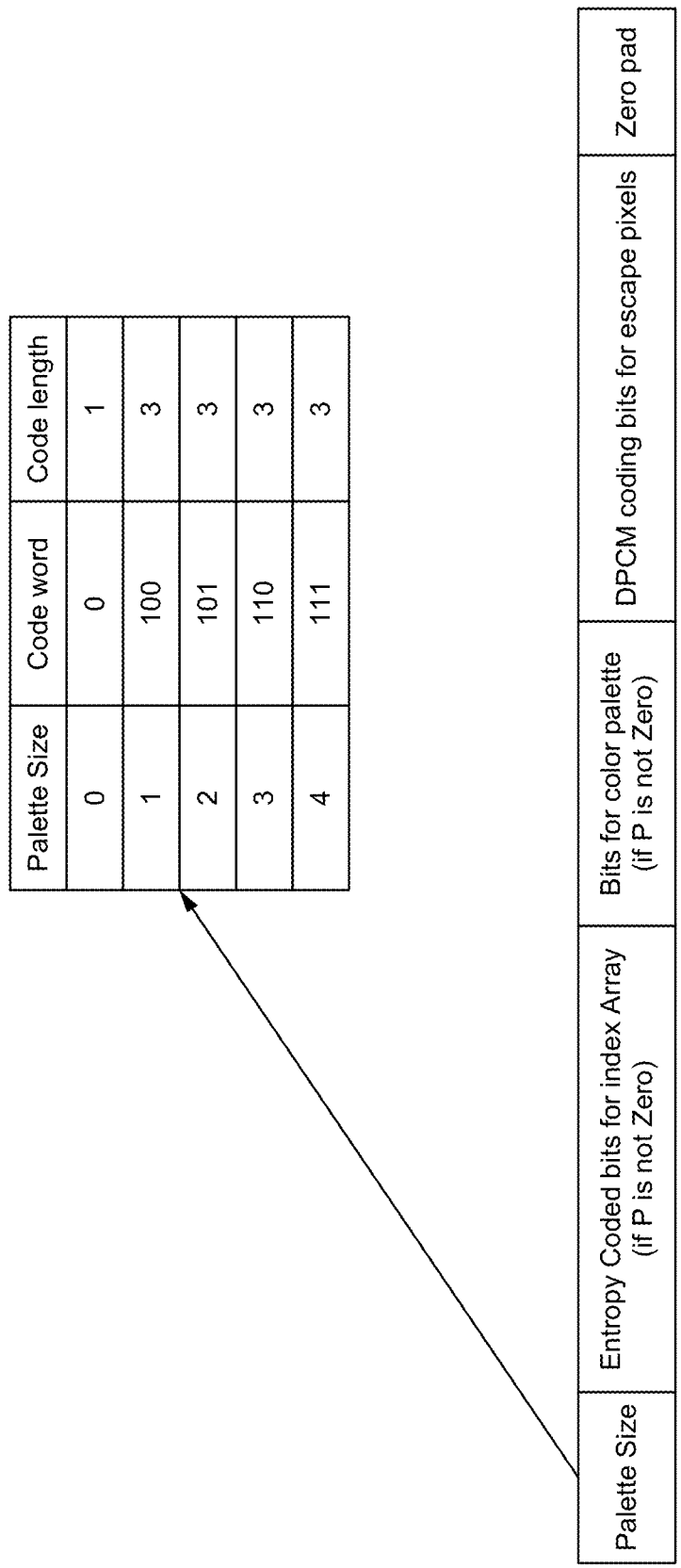
FIG. 7 illustrates an exemplary palette size and a bitstream according to some embodiments.

FIG. 7 illustrates an exemplary palette size and a bitstream according to some embodiments. Palette size (P) is able to be any arbitrary number from 0 to N (e.g., N=4). P=0 means there is no color in the palette, and all samples of the block are considered as escape pixels, and no sample is a non-escape pixel. The encoder signals to the decoder the value of the palette size. The code length of a palette=1+log 2(N), where N is the maximum allowable value of P, which is N=4 in this example.

The bitstream includes the palette size, entropy coded bits for the index array (if P is not zero), bits for the color palette (if P is not zero) and DPCM coding bits for escape pixels.

FIG. 8 illustrates a diagram of entropy coding the index array according to some embodiments. The index value (i)=0→P (where P is the palette size). FIG. 8 shows the difference index values, codewords and code lengths based on the palette sizes. In some embodiments, the last index value indicates an escape pixel not in the palette. For example, with palette size=2, index value 2 indicates escape pixels.

FIG. 9 illustrates a diagram of entropy coding the bits for the color palette according to some embodiments. For each color vector (YUV) in the palette: the number of luma bits:luma bit depth. For a certain special case, if (U=V=midvalue (1<<input bit depth)), 1 bit; otherwise, 1 bit is used to signal that the value U and V are not mid value, and number of U bits:input bit depth, and number of V bits:input bit depth.

FIG. 10 illustrates a diagram of the bitstream with DPCM coding highlighted according to some embodiments. As described herein, the escape pixels are encoded using DPCM. Specifically, quantization, DPCM and entropy coding are applied to the escape pixels.

Figure 11:
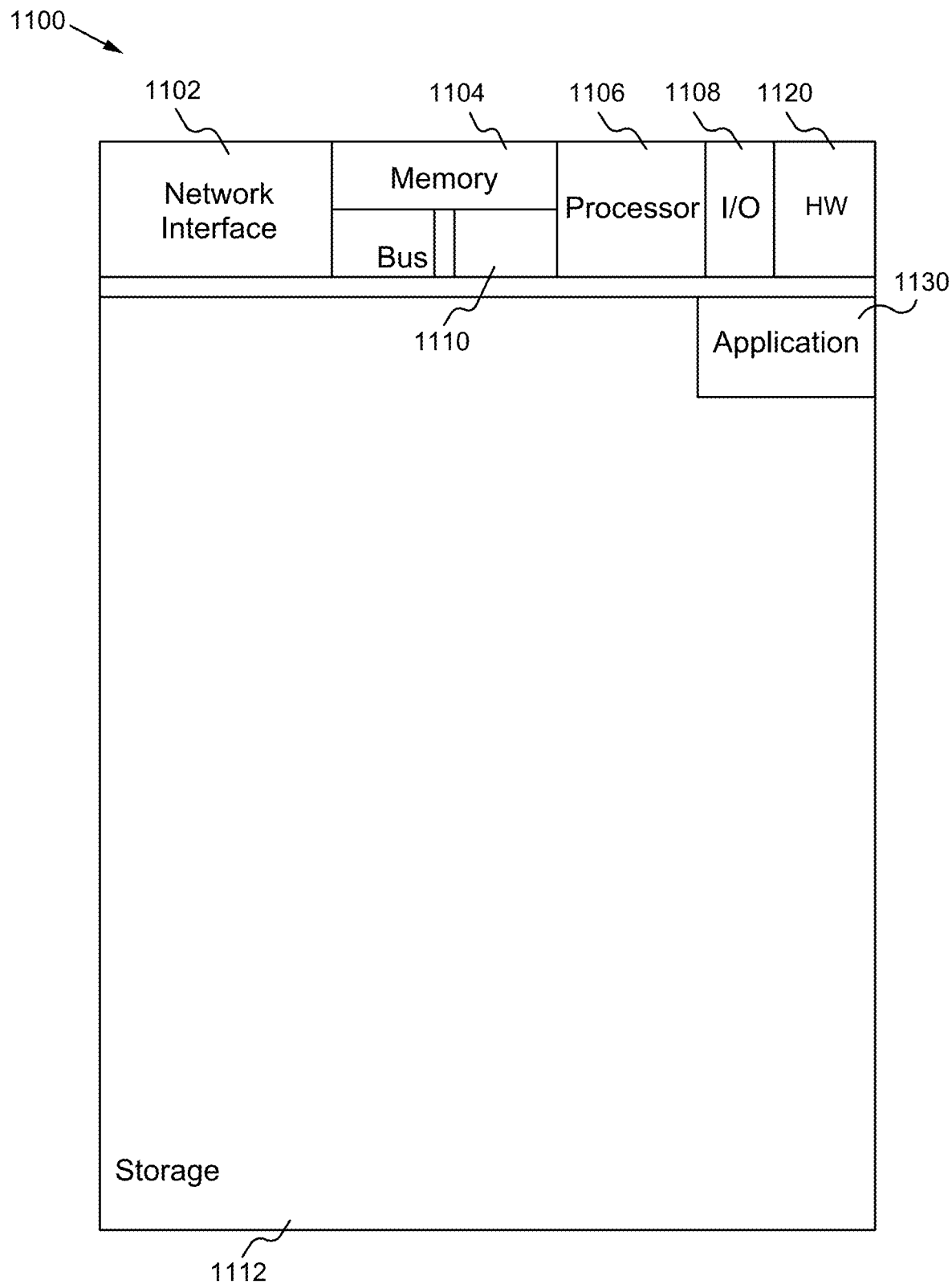
FIG. 11 illustrates a block diagram of an exemplary computing device configured to implement the hybrid palette-DPCM coding according to some embodiments.

FIG. 11 illustrates a block diagram of an exemplary computing device configured to implement the hybrid palette-DPCM coding according to some embodiments. The computing device 1100 is able to be used to acquire, store, compute, process, communicate and/or display information such as images and videos. The computing device 1100 is able to implement any of the hybrid palette-DPCM coding aspects such as encoding and/or decoding. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, High Definition disc/drive, ultra-HD drive, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, screen, printer, modem, touchscreen, button interface and other devices. Hybrid palette-DPCM coding application(s) 1130 used to implement the hybrid palette-DPCM coding are likely to be stored in the storage device 1112 and memory 1104 and processed as applications are typically processed. More or fewer components shown in FIG. 11 are able to be included in the computing device 1100. In some embodiments, hybrid palette-DPCM coding hardware 1120 is included. Although the computing device 1100 in FIG. 11 includes applications 1130 and hardware 1120 for the hybrid palette-DPCM coding, the hybrid palette-DPCM coding is able to be implemented on a computing device in hardware, firmware, software or any combination thereof. For example, in some embodiments, the hybrid palette-DPCM coding applications 1130 are programmed in a memory and executed using a processor. In another example, in some embodiments, the hybrid palette-DPCM coding hardware 1120 is programmed hardware logic including gates specifically designed to implement the hybrid palette-DPCM coding.

In some embodiments, the hybrid palette-DPCM coding application(s) 1130 include several applications and/or modules. In some embodiments, modules include one or more sub-modules as well. In some embodiments, fewer or additional modules are able to be included.

In some embodiments, the hybrid palette-DPCM coding hardware 1120 includes camera components such as a lens, an image sensor, and/or any other camera components.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., smart vehicle) or any other suitable computing device.

Figure 12:
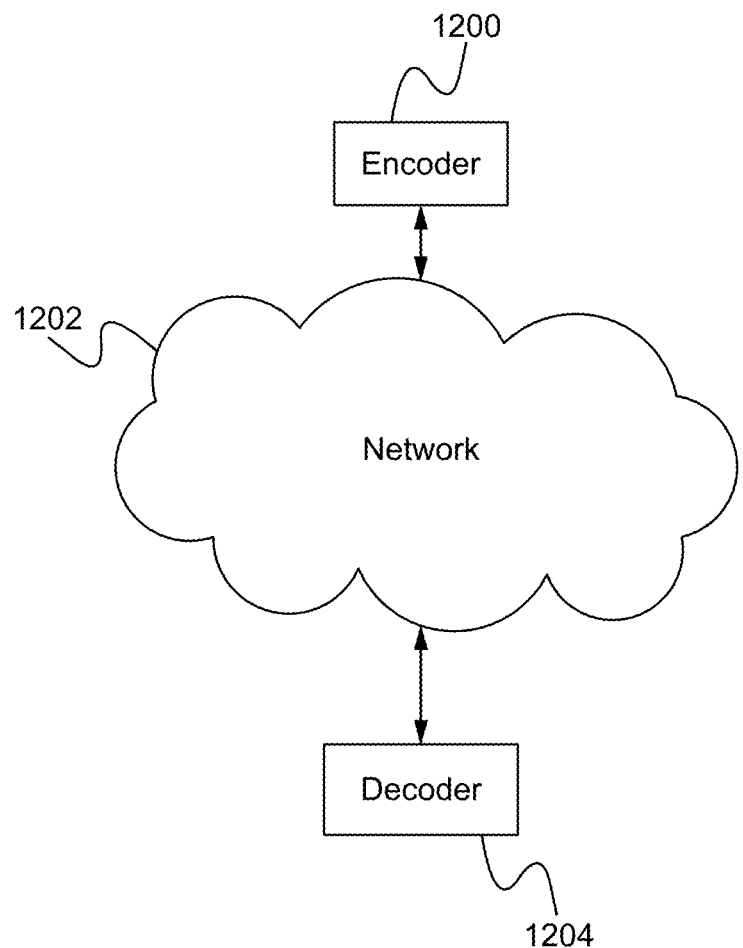
FIG. 12 illustrates a diagram of a network of devices according to some embodiments.

FIG. 12 illustrates a diagram of a network of devices according to some embodiments. Video/image content is encoded at one or more encoder devices 1200. The encoded content is transmitted/streamed through a network 1202 (e.g., the Internet, a cellular network or any other network) to one or more decoder devices 1204. In some embodiments, the content is transmitted to the one or more decoder devices 1204 directly without a network. The one or more devices of the network of devices (e.g., encoder device, decoder device) are configured to perform the hybrid palette-DPCM coding implementation described herein. The one or more encoder devices 1200 and the one or more decoder devices 1204 are able to be any device such as servers, a personal computers, smart phones, televisions, gaming systems, vehicles or any of the devices described herein or any combination of devices described herein.

To utilize the hybrid palette-DPCM coding described herein, devices such as digital cameras/camcorders are used to acquire content. The hybrid palette-DPCM coding is able to be implemented with user assistance or automatically without user involvement to efficiently encode, transmit, and decode content.

In operation, the hybrid palette-DPCM coding more efficiently encodes and decodes content by using palette coding for the most dominant color pixels and DPCM coding for the remaining color pixels, which provides better performance that palette coding alone or DPCM coding alone.

Some Embodiments of a Hybrid Palette-DPCM Coding for Image Compression

1. A method programmed in a non-transitory memory of a device comprising:
   generating a palette for an image block;
   generating an index block for the image block;
   transmitting the palette and the index block; and
   encoding escape pixels using differential pulse-code modulation.
2. The method of clause 1 wherein generating the palette includes: for a palette size of N, determining N most common colors in the image block and assigning an index to each color of the N most common colors.
3. The method of clause 2 wherein determining the N most common colors includes counting a number of pixels of each color.
4. The method of clause 2 wherein the index block is the same size as the image block, further wherein generating the index block includes placing indexes from the palette in the index block to represent pixel values, wherein an index of N+1 is placed in the locations for the escape pixels.
5. The method of clause 1 wherein encoding the escape pixels includes quantizing the escape pixels, applying the differential pulse-code modulation to the escape pixels, and entropy coding the escape pixels.
6. The method of clause 1 wherein transmitting the palette and the index block and encoding the escape pixels generate a bitstream including a palette size, an entropy coded index array, bits for the palette and differential pulse-code modulation bits for the escape pixels.
7. The method of clause 1 further comprising decoding the palette and the index block, decoding the escape pixels using inverse differential pulse-code modulation and combining the decoded palette, index block and escape pixels to generate a decoded image.
8. An apparatus comprising:
   a non-transitory memory for storing an application, the application for:
   generating a palette for an image block;
   generating an index block for the image block;
   transmitting the palette and the index block; and
   encoding escape pixels using differential pulse-code modulation; and
   a processor coupled to the memory, the processor configured for processing the application.
9. The apparatus of clause 8 wherein generating the palette includes: for a palette size of N, determining N most common colors in the image block and assigning an index to each color of the N most common colors.
10. The apparatus of clause 9 wherein determining the N most common colors includes counting a number of pixels of each color.
11. The apparatus of clause 9 wherein the index block is the same size as the image block, further wherein generating the index block includes placing indexes from the palette in the index block to represent pixel values, wherein an index of N+1 is placed in the locations for the escape pixels.
12. The apparatus of clause 8 wherein encoding the escape pixels includes quantizing the escape pixels, applying the differential pulse-code modulation to the escape pixels, and entropy coding the escape pixels.
13. The apparatus of clause 8 wherein transmitting the palette and the index block and encoding the escape pixels generate a bitstream including a palette size, an entropy coded index array, bits for the palette and differential pulse-code modulation bits for the escape pixels.
14. The apparatus of clause 8 wherein the application is further for decoding the palette and the index block, decoding the escape pixels using inverse differential pulse-code modulation and combining the decoded palette, index block and escape pixels to generate a decoded image.
15. A system comprising:
   a first computing device configured for:
   generating a palette for an image block;
   generating an index block for the image block;
   transmitting the palette and the index block; and
   encoding escape pixels using differential pulse-code modulation; and
   a second computing device configured for:
   decoding the palette and the index block, decoding the escape pixels using inverse differential pulse-code modulation and combining the decoded palette, index block and escape pixels to generate a decoded image.
16. The system of clause 15 wherein generating the palette includes: for a palette size of N, determining N most common colors in the image block and assigning an index to each color of the N most common colors.
17. The system of clause 16 wherein determining the N most common colors includes counting a number of pixels of each color.
18. The system of clause 16 wherein the index block is the same size as the image block, further wherein generating the index block includes placing indexes from the palette in the index block to represent pixel values, wherein an index of N+1 is placed in the locations for the escape pixels.
19. The system of clause 15 wherein encoding the escape pixels includes quantizing the escape pixels, applying the differential pulse-code modulation to the escape pixels, and entropy coding the escape pixels.
20. The system of clause 15 wherein transmitting the palette and the index block and encoding the escape pixels generate a bitstream including a palette size, an entropy coded index array, bits for the palette and differential pulse-code modulation bits for the escape pixels.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:
   generating a palette for an image block;
   generating an index block for the image block;
   transmitting the palette and the index block; and
   encoding escape pixels using differential pulse-code modulation, wherein generating the palette includes:

for a palette size of N, determining N most common colors in the image block and assigning an index to each color of the N most common colors, wherein the index block is the same size as the image block, further wherein generating the index block includes placing indexes from the palette in the index block to represent pixel values, wherein an index of N+1 is placed in the locations for the escape pixels, wherein a 0 is placed in a position of the index block of a most common pixel color, a 1 is placed in the position of the index block of a second most common pixel color, and a 2 is placed in the position of the index block of any other color, wherein encoding the escape pixels includes quantizing the escape pixels, applying the differential pulse-code modulation to the escape pixels, and entropy coding the escape pixels.

2. The method of claim 1 wherein determining the N most common colors includes counting a number of pixels of each color.

3. The method of claim 1 wherein transmitting the palette and the index block and encoding the escape pixels generate a bitstream including a palette size, an entropy coded index array, bits for the palette and differential pulse-code modulation bits for the escape pixels.

4. The method of claim 1 further comprising decoding the palette and the index block, decoding the escape pixels using inverse differential pulse-code modulation and combining the decoded palette, index block and escape pixels to generate a decoded image.

5. An apparatus comprising:
a non-transitory memory for storing an application, the application for:
generating a palette for an image block;
generating an index block for the image block;
transmitting the palette and the index block; and
encoding escape pixels using differential pulse-code modulation, wherein generating the palette includes: for a palette size of N, determining N most common colors in the image block and assigning an index to each color of the N most common colors, wherein the index block is the same size as the image block, further wherein generating the index block includes placing indexes from the palette in the index block to represent pixel values, wherein an index of N+1 is placed in the locations for the escape pixels, wherein a 0 is placed in a position of the index block of a most common pixel color, a 1 is placed in the position of the index block of a second most common pixel color, and a 2 is placed in the position of the index block of any other color, wherein encoding the escape pixels includes quantizing the escape pixels, applying the differential pulse-code modulation to the escape pixels, and entropy coding the escape pixels; and
a processor coupled to the memory, the processor configured for processing the application.

6. The apparatus of claim 5 wherein determining the N most common colors includes counting a number of pixels of each color.

7. The apparatus of claim 5 wherein transmitting the palette and the index block and encoding the escape pixels generate a bitstream including a palette size, an entropy coded index array, bits for the palette and differential pulse-code modulation bits for the escape pixels.

8. The apparatus of claim 5 wherein the application is further for decoding the palette and the index block, decoding the escape pixels using inverse differential pulse-code modulation and combining the decoded palette, index block and escape pixels to generate a decoded image.

9. A system comprising:
a first computing device configured for:
generating a palette for an image block;
generating an index block for the image block;
transmitting the palette and the index block; and
encoding escape pixels using differential pulse-code modulation, wherein generating the palette includes: for a palette size of N, determining N most common colors in the image block and assigning an index to each color of the N most common colors, wherein the index block is the same size as the image block, further wherein generating the index block includes placing indexes from the palette in the index block to represent pixel values, wherein an index of N+1 is placed in the locations for the escape pixels, wherein a 0 is placed in a position of the index block of a most common pixel color, a 1 is placed in the position of the index block of a second most common pixel color, and a 2 is placed in the position of the index block of any other color, wherein encoding the escape pixels includes quantizing the escape pixels, applying the differential pulse-code modulation to the escape pixels, and entropy coding the escape pixels; and
a second computing device configured for:
decoding the palette and the index block, decoding the escape pixels using inverse differential pulse-code modulation and combining the decoded palette, index block and escape pixels to generate a decoded image.

10. The system of claim 9 wherein determining the N most common colors includes counting a number of pixels of each color.

11. The system of claim 9 wherein transmitting the palette and the index block and encoding the escape pixels generate a bitstream including a palette size, an entropy coded index array, bits for the palette and differential pulse-code modulation bits for the escape pixels.

12. A method programmed in a non-transitory memory of a device comprising:
generating a palette for an image block;
generating an index block for the image block;
transmitting the palette and the index block; and
encoding escape pixels using differential pulse-code modulation, wherein transmitting the palette and the index block and encoding the escape pixels generate a bitstream including a palette size, an entropy coded index array, bits for the palette and differential pulse-code modulation bits for the escape pixels, wherein a 0 is placed in a position of the index block of a most common pixel color, a 1 is placed in the position of the index block of a second most common pixel color, and a 2 is placed in the position of the index block of any other color, wherein any other color is an escape pixel and is not in the palette, wherein encoding the escape pixels includes quantizing the escape pixels, applying the differential pulse-code modulation to the escape pixels, and entropy coding the escape pixels.

13. The method of claim 12 wherein generating the palette includes: for a palette size of N, determining N most common colors in the image block and assigning an index to each color of the N most common colors.

14. The method of claim 13 wherein determining the N most common colors includes counting a number of pixels of each color.

15. The method of claim 12 further comprising decoding the palette and the index block, decoding the escape pixels using inverse differential pulse-code modulation and combining the decoded palette, index block and escape pixels to generate a decoded image.

\* \* \* \* \*